(12) United States Patent
Hong et al.

(10) Patent No.: US 7,406,020 B2
(45) Date of Patent: Jul. 29, 2008

(54) METHOD OF WRITING DATA ON A STORAGE DEVICE USING A PROBE TECHNIQUE

(75) Inventors: Seung-bum Hong, Seongnam-si (KR); Sung-dong Kim, Seongnam-si (KR); Ju-hwan Jung, Seoul (KR); Dong-ki Min, Seoul (KR); Hong-sik Park, Seoul (KR); Kyoung-lock Baeck, Busan-si (KR); Chul-min Park, Suwon-si (KR); Yun-seok Kim, Namyangju-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 454 days.

(21) Appl. No.: 10/934,561

(22) Filed: Sep. 7, 2004

(65) Prior Publication Data

US 2005/0052984 A1      Mar. 10, 2005

(30) Foreign Application Priority Data

Sep. 6, 2003      (KR) ............... 10-2003-0062376

(51) Int. Cl.
*G11B 7/00* (2006.01)
(52) U.S. Cl. .................................. 369/126
(58) Field of Classification Search ............ 369/126, 369/100; 324/762
See application file for complete search history.

(56) References Cited

U.S. PATENT DOCUMENTS 6,392,934 B1    5/2002  Saluel et al.
6,597,639 B1    7/2003  Hamann et al.
7,141,999 B2 *  11/2006 Park et al. ............ 324/762

FOREIGN PATENT DOCUMENTS

JP        5-182261 A       7/1993

OTHER PUBLICATIONS

Benjamin W. Chui, et al., "Micromachined heaters with 1-μs thermal time constants for AFM thermomechanical data storage", Tranducers 97. 1997 International Conference on Solid-State Sensors and Actuators. Digest of Technical Papers (Cat. No. 97TH8267) IEEE New York, NY, USA, vol. 2, 1997, pp. 1085-1088, XP002301257.
Dong Weon Lee et al., "Recording on PZT and AgInSbTe thin films for probe-based data storage", the 15TH IEEE International Conference on Micro Electro Mechanical Systems, 2002, pp. 685-688, XP 010577747.
Suh Moon Suhk et al., "Silicon-based field-effect-transistor cantilever for surface potential mapping", Applied Physics Letters, American Institute of Physics. New York, US, vol. 83, No. 2, Jul. 14, 2003, pp. 386-388, XP012035489.

* cited by examiner

*Primary Examiner*—Nabil Hindi
(74) *Attorney, Agent, or Firm*—Sughrue Mion, PLLC

(57) ABSTRACT

A method of writing data on a storage device using a probe technique. In the method of writing data on a memory device including a resistive probe used for reading and writing of data, a ferroelectric writing medium on which data is written by the resistive probe, and a lower electrode disposed on a bottom surface of the ferroelectric writing medium, heat and an electric field are applied simultaneously to a domain of the ferroelectric writing medium, on which the data will be written, by applying a voltage to the resistive probe and the lower electrode.

15 Claims, 5 Drawing Sheets

METHOD OF WRITING DATA ON A STORAGE DEVICE USING A PROBE TECHNIQUE

CROSS-REFERENCE TO RELATED APPLICATIONS

This application claims priority from Korean Patent Application No. 2003-62376, filed on Sep. 6, 2003, in the Korean Intellectual Property Office, the disclosure of which is incorporated herein by reference in its entirety.

BACKGROUND OF THE INVENTION

1. Field of the Invention

The present invention relates to a method of writing data, and more particularly, to a method of writing data on a ferroelectric layer using a resistive probe.

2. Description of the Related Art

Regarding developments in Internet-related technologies, a writing medium on which a large amount of data including motion pictures can be written (hereinafter, referred to as a "high-density writing medium") and a portable device for writing the data on the writing medium and reading the written data have lately attracted considerable attention as important products on the writing media market.

A portable nonvolatile data writing device can be categorized as either a solid-state memory device, such as a flash memory, or a disk-type memory device, such as a hard disk.

Since it is anticipated that the needs for primary storage in hand-held devices will reach a capacity of up to several tens of gigabytes in upcoming years, it is difficult for the solid-state memory device to function as a high-density data writing device, probably due to limitations in the lithography technology. Therefore, the solid-state memory device will be used for a device requiring high-speed operations, such as a current personal computer (PC), while the disk-type memory device still will be used as a main storage device.

It is expected that a hard disk of a general magnetic writing type will be developed to have a capacity of up to 10 gigabytes in the near future. However, it is currently impossible to obtain a hard disk that has a higher magnetic writing density than that of the 10-GB hard disk, due to the superparamagnetic effect.

For this reason, a scanning probe has been proposed as a device for writing and reading data, and a memory device formed of a ferroelectric layer has been proposed as a writing medium.

In a technique using a scanning probe, i.e., a scanning probe microscope (SPM), a domain ranging from several nanometers (nm) to several tens of nanometers can be manipulated and probed through a probe.

In recent years, a probe has been manufactured in an array shape through a micro-electro-mechanical system (MEMS) such that parallel reading and writing are enabled to overcome the restrictions of reading and writing speeds.

In a memory device using SPM, written data can be identified by the polarity of electric charges, which are generated on a surface of a ferroelectric layer according to the remnant polarization of the ferroelectric layer, or on a direction of the remnant polarization. The electric charges, which are generated on the surface of the ferroelectric layer according to the remnant polarization, generate an electric field around them. This electric field creates a depletion region or an accumulation region at the end of the probe. The capacitance or resistance of the memory device varies depending on whether the depletion region is formed or the accumulation region is formed and according to the type of probe. The memory device using SPM measures a variation in the capacitance or the resistance to enable reading of data.

This memory device, which operates through SPM and employs a ferroelectric layer as a writing medium, allows higher-density writing of data than a memory device using a magnetic writing medium. However, the memory device using SPM has the following problems.

Specifically, writing data on a ferroelectric layer includes switching a polarization direction of a domain of the ferroelectric layer by applying the same voltage to both ends of a probe. Thus, when the coercive field is large, to ensure thermal stability as the domain size decreases for a high density storage device, the voltage applied to both ends of the probe may cause an electric field that exceeds the dielectric strength of the air gap between the probe and surface of the medium.

Therefore, when the voltage applied to both ends of the probe is too high, since an interval between the probe and the ferroelectric layer is extremely small, an electrical breakdown, such as a corona discharge, may occur therebetween.

Meanwhile, heat assisted magnetic writing (HAMR) has been in the spotlight recently as one of the next-generation magnetic writing technologies. HAMR is being applied to a method and device of writing data on a magnetic writing medium. In the memory device using HAMR, prior to writing data, a predetermined domain of a magnetic writing medium on which the data will be written is heated using a laser. Thereafter, a magnetic field is applied to the heated domain, thereby writing data on the magnetic writing medium.

The heating step and the magnetic field applying step are performed separately. Thus, it takes much time to write data. Accordingly, to shorten the time, the heating step and the magnetic field applying step should be performed at the same time. However, a coil for generating the magnetic field and a laser diode for generating heat cannot be located in the same space. Further, since an interval between a magnetic writing head and a writing medium is very narrow, applying the magnetic field and the heat at the same time is almost impossible.

SUMMARY OF THE INVENTION

The present invention provides a method of writing data on a memory device using SPM, which allows writing of data on a ferroelectric layer having a high coercive field by applying a very low voltage to the ferroelectric layer.

According to an aspect of the present invention, there is provided a method of writing data on a memory device comprising a resistive probe used for reading and writing data, a ferroelectric writing medium on which data is written by the resistive probe, and a lower electrode disposed on a bottom surface of the ferroelectric writing medium. The method comprises applying heat and an electric field at the same time to a domain of the ferroelectric writing medium, on which the data will be written, by applying voltages to the resistive probe and the lower electrode.

A predetermined voltage Vr may be applied to a portion of the resistive probe, which is nearest to the ferroelectric writing medium, and another predetermined voltage V3 may be applied to the lower electrode. Here, a relationship between the voltage Vr and the voltage V3 can be expressed as in equation 1.

$$|V3-Vr|>Vc \qquad (1)$$

The predetermined voltage Vr may be applied to the portion of the resistive probe, which is nearest to the ferroelectric writing medium, by applying a first voltage V1 and a second voltage V2 to the resistive probe. The first voltage V1 differs from the second voltage V2.

Although the ferroelectric writing medium is preferably formed of a PZT layer, it is possible to use a BTO layer, a TGS layer, or a TGSe layer instead.

The ferroelectric writing medium may be formed of a dielectric layer having a high coercive field in the domain on which data will be written.

According to another aspect of the present invention, there is provided a method of writing data on a memory device comprising a resistive probe used for reading and writing data, a ferroelectric writing medium on which data is written by the resistive probe, and a lower electrode disposed on a bottom surface of the ferroelectric writing medium. The method comprises (a) lowering a coercive field in a domain of the ferroelectric writing medium, on which data will be written, and (b) writing data on the domain of the ferroelectric writing medium having the lowered coercive field. Steps (a) and (b) may be performed at the same time.

In step (a), the coercive field may be lowered by heating the domain of the ferroelectric writing medium, on which data will be written.

The domain of the ferroelectric writing medium, on which data will be written, may be heated by generating heat in a portion of the resistive probe, which is most adjacent to the ferroelectric writing medium.

The heat may be generated in the portion of the resistive probe, which is most adjacent to the ferroelectric writing medium, by applying a first voltage V1 and a second voltage V2 to the resistive probe. The first voltage V1 differs from the second voltage V2.

In step (b), the writing of data can be performed by applying an electric field to the domain of the ferroelectric writing medium.

A predetermined voltage Vr may be applied to a portion of the resistive probe, which is nearest to the ferroelectric writing medium, and another predetermined voltage V3 may be applied to the lower electrode. Here, a relationship between the voltage Vr and the voltage V3 can be expressed as in equation 1 above, that is, $|V3-Vr|>Vc$.

In the present invention, to write data, heat and an electric field are simultaneously applied to a domain of a ferroelectric layer, on which data will be written. The heat applied to the ferroelectric layer can lower the coercive field of the ferroelectric layer so as to switch a domain with a lower voltage. Also, writing data can be performed at high speed by applying the heat and the electric field at the same time. Further, a writing medium having a high coercive field can be used to enhance thermal stability. Thus, a domain of a ferroelectric layer with a high coercive field can be effectively switched, without an electrical breakdown between the probe and layer surface.

BRIEF DESCRIPTION OF THE DRAWINGS

The above object and advantages of the present invention will become more apparent by describing in detail exemplary embodiments thereof with reference to the attached drawings in which.

DETAILED DESCRIPTION OF THE INVENTION

Figure 1:
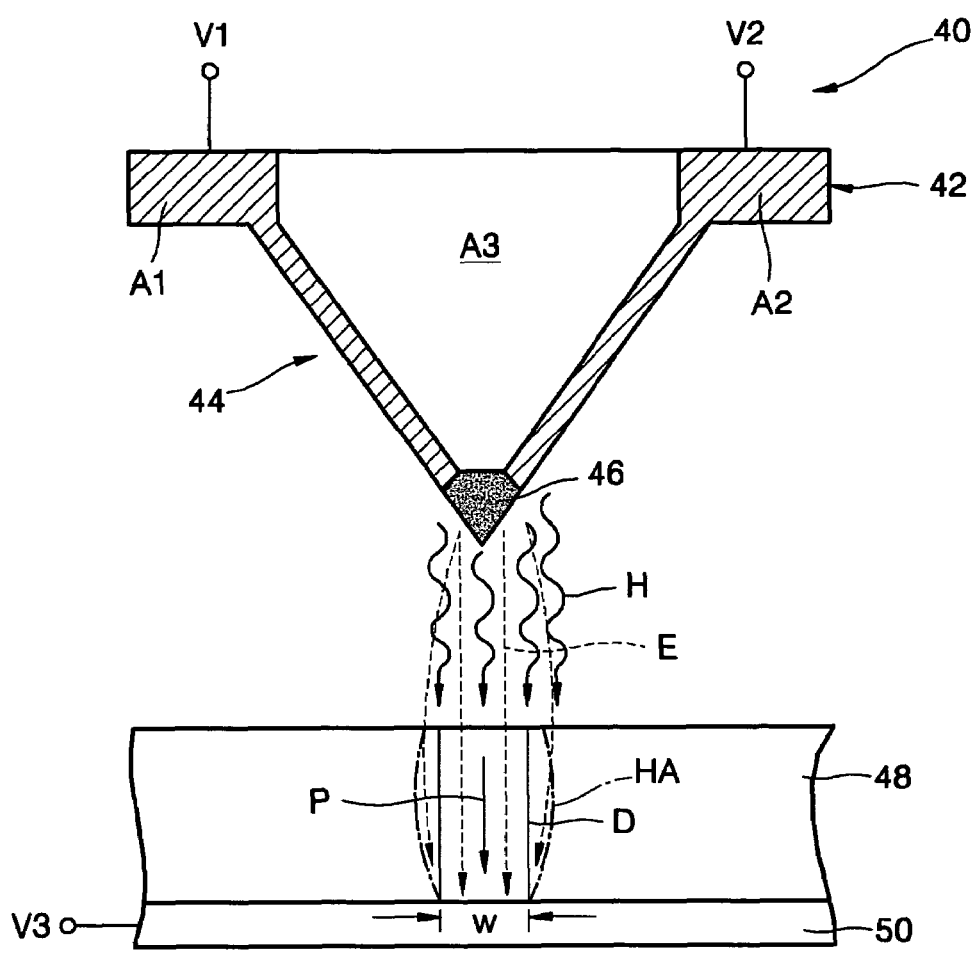
FIG. 1 is a sectional view illustrating a method of writing data according to an embodiment of the present invention, in which data is written on a ferroelectric layer using a resistive probe.

The present invention will now be described more fully with reference to the accompanying drawings, in which an exemplary embodiment of the invention is shown. In the drawings, the thicknesses of layers or regions may be exaggerated for clarity.

Referring to FIG. 1, reference numeral 48 denotes a ferroelectric layer used as a data writing medium. Although the ferroelectric layer 48 is preferably a PZT layer, it is possible to use other ferroelectric layers, for example, a $BaTiO_3$ (BTO) layer, a triglycine sulfate (TGS) layer, or a triglycine selenate (TGSe) layer. A lower electrode 50 is disposed on a bottom surface of the ferroelectric layer 48. To write data, a third voltage V3 is applied to the lower electrode 50. A probe 40 is disposed above the ferroelectric layer 48. The probe 40 is positioned at the end of a cantilever (not shown) connected to a power supplier (not shown). The probe 40 comprises a flat panel portion 42, which is connected to the cantilever, and a protruding portion 44, which is connected to a bottom of the flat panel portion 42 and protrudes toward the ferroelectric layer 48. The protruding portion 44 converges to a point starting from the flat panel portion 42 going toward the ferroelectric layer 48. A tip 46, including an apex of the protruding portion 44, is adjacent to a surface of the ferroelectric layer 48, on which data will be written. The tip 46 is doped with n-type conductive impurities and has a higher resistance than a first region A1 or a second region A2 that will be described later. The flat panel portion 42 is symmetrical with respect to the protruding portion 44. The first region A1 and the second region A2 are disposed on the flat panel region 42 on both sides of the protruding portion 44. The first and second regions A1 and A2 are doped with $n^+$-type conductive impurities. The first and second regions A1 and A2 expand to the tip 46 along a surface of the protruding portion 44. In writing data, a first voltage V1 is applied to the first region A1 and a second voltage V2 is applied to the second region A2. A third region A3 is disposed inside the probe 40. The third region A3 is interposed between the first and second regions A1 and A2. The third region A3 is doped with p-type conductive impurities. The dopant concentrations of the first through third regions A1, A2, and A3 and the tip 46 depend on data writing conditions.

Hereinafter, a method of writing data on the ferroelectric layer 48 will be described with reference to FIG. 1.

The first voltage V1 and the second voltage V2 are applied to the first region A1 and the second region A2 of the probe 40, respectively. At the same time, the third voltage V3 is applied to the lower electrode 50. Here, the second voltage V2 is higher than the first voltage V1. While the first voltage V1 and the second voltage V2 are being applied to the first region A1 and the second region A2, Joule heat is generated in the tip 46. The Joule heat (Q) can be expressed by the following equation 2.

$$Q=I^2Rt \quad (2)$$

In the equation (2), I refers to an electrical current flowing into the tip 46, R is a resistance of the tip 46, and t refers to a period of time.

For example, when a current of 1 mA flows into the tip 46 for a period of 100 ns and a resistance of the tip 46 is 2 kΩ, a heat of (1 mA)²×2 kΩ×100 ns=0.2 nJ is generated to increase the temperature of the tip 46.

When the first voltage V1 and the second voltage V2 are respectively applied to the first region A1 and the second region A2, just as Joule heat is generated in the tip 46, a voltage Vr that satisfies the following equation 3 is applied to the tip 46.

$$Vr=(V2-V1)/2 \tag{3}$$

A relationship between the voltage Vr applied to the tip 46 and the third voltage V3 applied to the lower electrode 50 can be expressed as shown in the equation 1 above, that is, |V3−Vr|>Vc.

In the equation 1, Vc refers to a coercive voltage. The coercive voltage Vc is a minimum voltage required for inversing a direction of the remnant polarization existing in the ferroelectric layer 48, i.e., a critical voltage.

Accordingly, equation 1 explains that a difference in voltage between the tip 46 and the lower electrode 50 should be more than the critical voltage in a domain of the ferroelectric layer 48, which is disposed directly under the tip 46.

As described above, the first voltage V1 and the second voltage V2, which differs from the first voltage V1, are applied to the first region A1 and the second region A2, and the third voltage V3 that satisfies the equation 1 is applied to the lower electrode 50. Thus, Joule heat is generated in the tip 46 and an electric field E occurs between the tip 46 and the lower electrode 50, due to the difference in voltage therebetween (|V3−Vr|). Thus, a region HA of the ferroelectric layer 48, which is disposed directly under the tip 46, receives a heat H generated from the tip 46 and simultaneously is inside the electric field E. A domain D having a predetermined width W is aligned with the region HA of the ferroelectric layer 48, which is disposed directly under the tip 46, by the electric field E. Reference character P denotes a remnant polarization in the domain D aligned by the electric field E. The width W of the domain D may become narrower or wider by controlling a difference in voltage between the tip 46 and the lower electrode 50 or a time required for applying the voltage pulse.

Meanwhile, if heat is applied from the tip 46 to the region HA including the domain D of the ferroelectric layer 48, the coercive field required for inversing the remnant polarization of the domain D is lowered. Accordingly, the intensity of the electric field E required for inversing the remnant polarization P in the domain D of the ferroelectric layer 48, which is being heated, may be lower than the intensity of the electric field required for inversing the remnant polarization P in the domain D, which is not being heated. That is, if the electric field E is applied to the ferroelectric layer 48 while heating the ferroelectric layer 48, the remnant polarization of the domain D can be inversed at a lower voltage than in the conventional method. In other words, since a direction of the remnant polarization corresponds to data "0" or "1", that means it is possible to reduce a voltage to write data on the ferroelectric layer 48.

The coercive field of the ferroelectric layer 48 can be reduced by applying heat to the ferroelectric layer 48, and this will be described in more detail with reference to FIGS. 2 through 4.

Figure 2A:
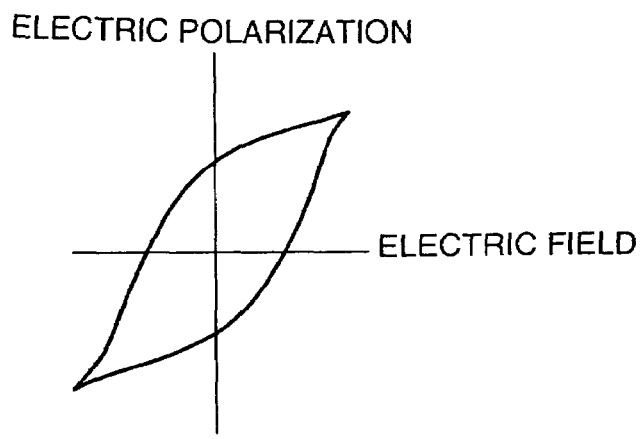
FIGS. 2A through 2D are graphs showing that hysteresis loops vary according to the temperature in the ferroelectric layer shown in FIG. 1.
Figure 2B:
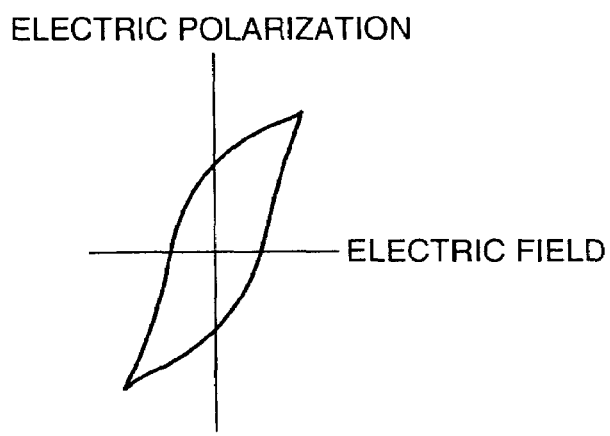
Figure 2C:
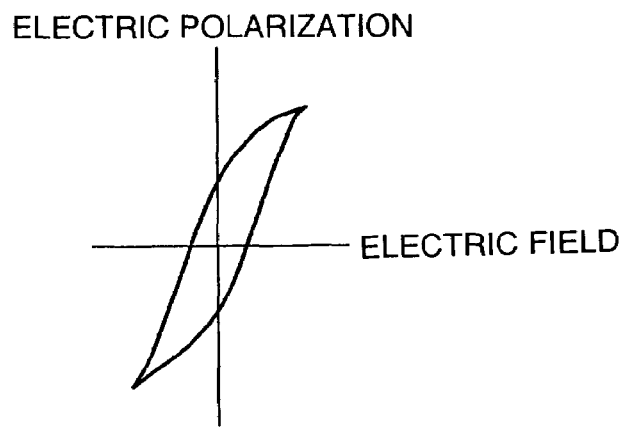
Figure 2D:
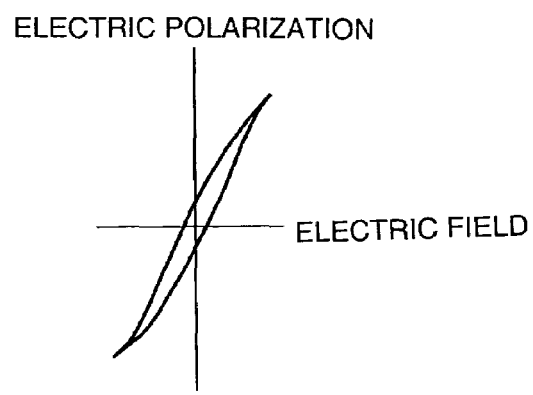

FIGS. 2A through 2D are graphs showing that hysteresis loops (hereinafter, loops) vary according to the temperature in the ferroelectric layer shown in FIG. 1. FIG. 2A is a loop under the condition that a temperature of the ferroelectric layer 48 was −5.5° C., and FIG. 2A is a loop under the condition that a temperature of the ferroelectric layer 48 was 0° C. FIG. 2C is a loop under the condition that a temperature of the ferroelectric layer 48 was 60° C., and FIG. 2D is a loop under the condition that a temperature of the ferroelectric layer 48 was 120° C.

Referring to FIGS. 2A through 2D, as temperature increases, both a vertical width of the loop obtained when a voltage is 0 V and a horizontal width of the loop obtained when a remnant polarization is 0 become smaller. This is because as the temperature increases, the magnitude of the remnant polarization becomes smaller and the voltage required for inversion of the remnant polarization becomes lower. As can be seen from FIGS. 2A through 2D, this tendency is applied likewise to a case where a temperature of the ferroelectric layer 48 is more than 120° C.

Also, if the remnant polarization becomes smaller and the voltage required for inversion of the remnant polarization becomes lower as the temperature of the ferroelectric layer 48 increases, the coercive voltage or the intensity of coercive field may decrease. This will be described in more detail with reference to FIGS. 3 and 4.

Figure 3:
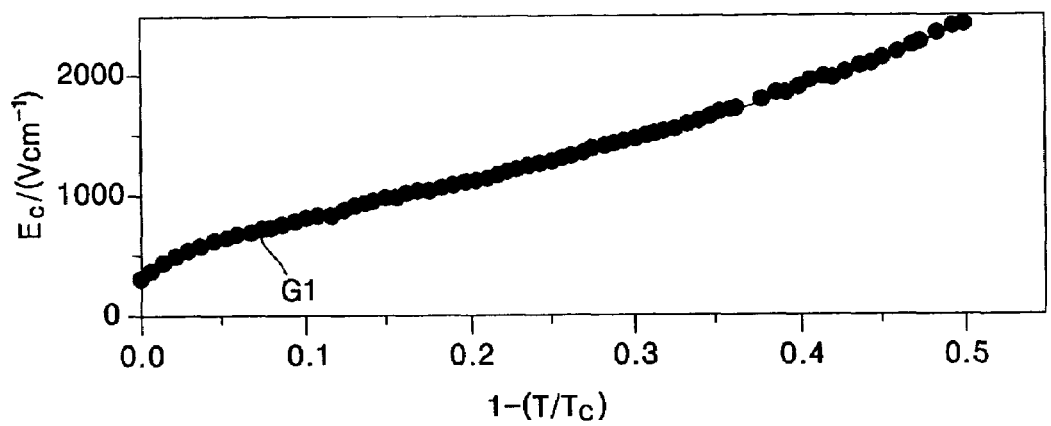
FIGS. 3 and 4 are graphs showing that coercive fields vary according to the temperature in the ferroelectric layer shown in FIG. 1.
Figure 4:
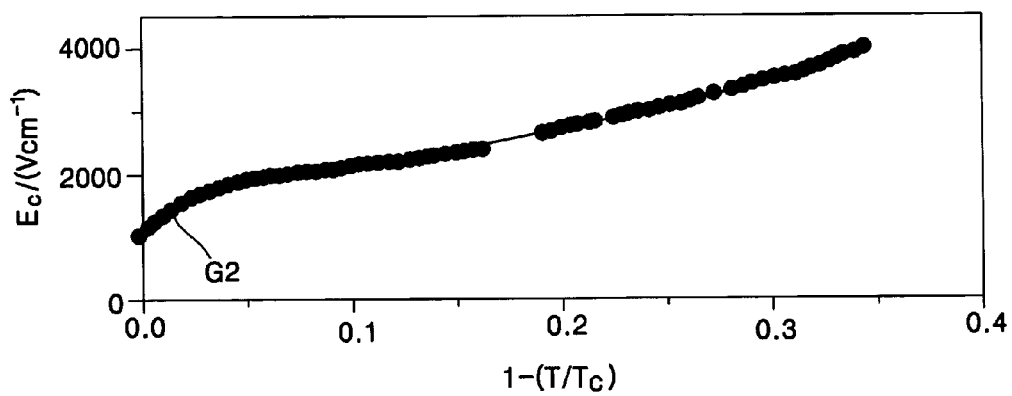

FIG. 3 shows that a coercive field Ec varies according to the temperature in a ferroelectric layer formed of TGS, and FIG. 4 shows that a coercive field Ec varies according to the temperature in a ferroelectric layer formed of TGSe.

Reference character G1 of FIG. 3 and reference character G2 of FIG. 4 refer to a first graph and a second graph, respectively, each of which shows a variation in the coercive field Ec.

Referring to the first and second graphs G1 and G2, as the temperature T of the ferroelectric layer is gradually increased to Curie temperature Tc, the coercive field Ec of the ferroelectric layer is decreased.

The characteristic of the coercive field, as shown in the first and second graphs G1 and G2, can be found likewise in other ferroelectric layers, for example, a PZT layer or a BTO layer.

As described above with reference to FIGS. 2 through 4, as the temperature of the ferroelectric layer increases, the remnant polarization of the ferroelectric layer becomes smaller and the voltage required for inversion of the remnant polarization becomes lower. As a result, the coercive field becomes lower.

Hereinafter, a variation in the temperature of the tip 46 according to the first and second voltages V1 and V2 will be described.

Figure 5:
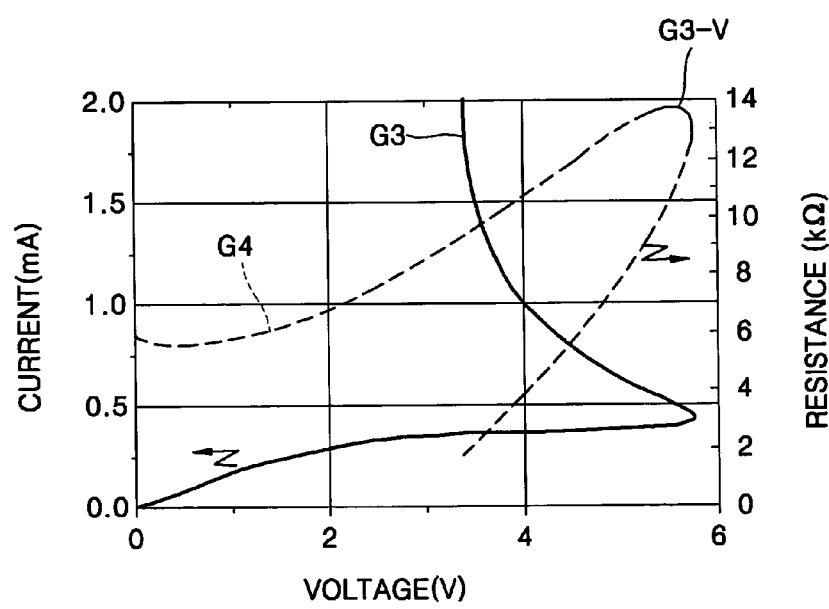
FIG. 5 is a graph showing current and resistance characteristics according to the voltage applied to a conventional resistive probe.

FIG. 5 is a graph showing current and resistance characteristics according to the voltage applied to a resistive probe in a conventional method of writing data.

In FIG. 5, reference characters G3 and G4 refer to a third graph showing the current characteristic and a fourth graph showing the resistance characteristic, respectively. In an apex G4-V of the fourth graph G4, a tip (not shown) of the conventional resistive probe was heated to a temperature of 500° C. to 700° C.

Figure 6:
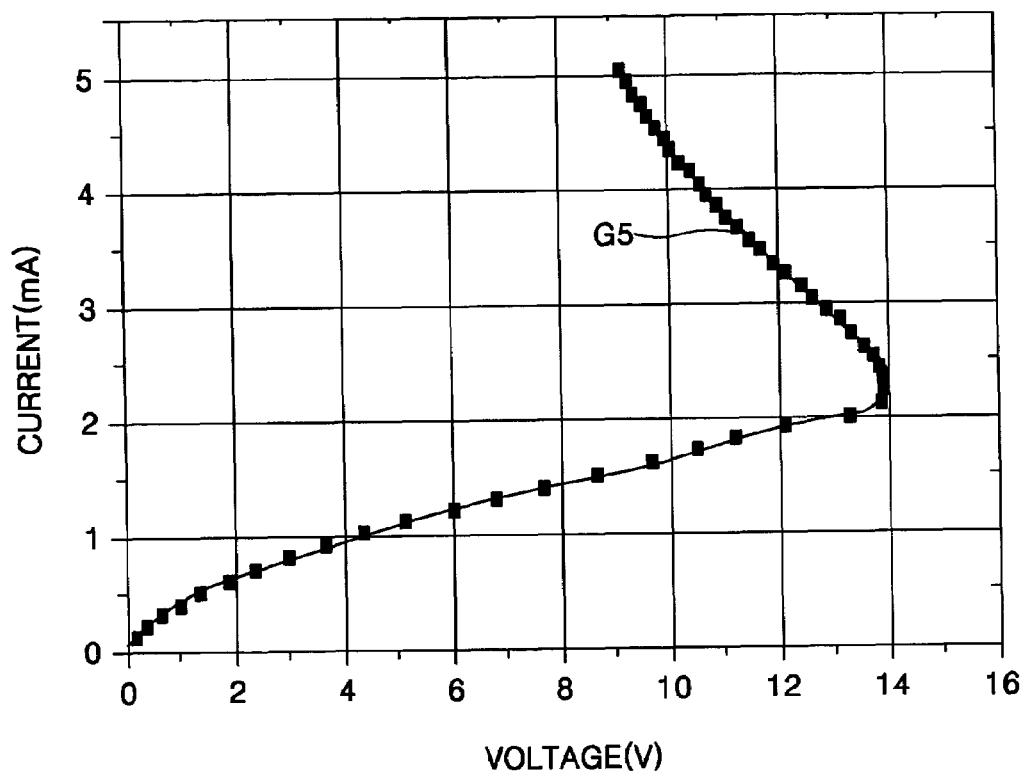
FIG. 6 is a graph showing a current characteristic of the resistive probe shown in FIG. 1.

Reference character G5 of FIG. 6 refers to a fifth graph showing a voltage characteristic according to current applied to the probe shown in FIG. 1, in the method of writing data according to the present invention.

When the third graph G3 of FIG. 5 is compared with the fifth graph G5 of FIG. 6, it can be seen that both of them are very similar. Accordingly, in the method of writing data according to the present invention, a resistance characteristic according to the current applied to the probe can be the same as shown in the fourth graph G4 of FIG. 5.

As a result, in the method of writing data according to the present invention, the tip 46 of the probe 40 shown in FIG. 1 can be heated up to 500° C. to 700° C.

This resistance characteristic or the current characteristic depends on the dopant concentration of the first region A1 and the second region A2 and the tip 46 of the probe 40. Accordingly, the temperature of the tip 46 can be properly controlled by controlling the dopant concentrations of the first region A1 and the second region A2 and the tip 46 in a manufacturing process of the probe 40.

As explained thus far, in the method of writing data according to the present invention, two different voltages are applied to two electrodes of a probe. Thus, Joule heat is generated in a tip of the probe and, simultaneously, a voltage, which is equal to half the difference between the voltages applied to the two electrodes of the probe, is applied to the tip. Also, a predetermined voltage is applied to a lower electrode disposed on a bottom surface of a ferroelectric layer, which is a writing medium, such that a difference between the predetermined voltage and the voltage applied to the tip is not less than a coercive voltage. Thus, while a domain of the ferroelectric layer, which is disposed directly under the tip, is being heated by the Joule heat generated from the tip of the probe, an electric field is applied to the heated domain so as to inverse a direction of remnant polarization in the heated domain. As a result, data can be written on the ferroelectric layer.

In the present invention, both a heat and an electric field are applied to a given domain of a ferroelectric layer on which data is written. Since the heat applied to the ferroelectric layer lowers the coercive field of the ferroelectric layer, the domain can be switched at a lower voltage. Also, the heat and the electric field are applied at the same time, thereby enabling high-speed writing of data. Also, even if a writing medium having a high coercive field is used to improve thermal stability, no electrical breakdown occurs and the domain of the ferroelectric layer can be switched effectively.

While the present invention has been particularly shown and described with reference to exemplary embodiments thereof, it will be understood by those of ordinary skill in the art that various changes in form and details may be made therein without departing from the spirit and scope of the present invention as defined by the following claims.

What is claimed is:

1. A method of writing data on a memory device comprising a resistive probe used for reading and writing of data, a ferroelectric writing medium on which data is written by the resistive probe, and a lower electrode disposed on a bottom surface of the ferroelectric writing medium, the method comprising:

applying heat and an electric field simultaneously to a domain of the ferroelectric writing medium, on which the data will be written, by applying voltages to the resistive probe and the lower electrode.

2. The method of claim 1, wherein a predetermined voltage Vr is applied to the resistive probe, which is most adjacent to the domain of the ferroelectric writing medium, and another predetermined voltage V3 is applied to the lower electrode, wherein a relationship between the voltage Vr and the voltage V3 is expressed as in the following equation:

$$|V3-Vr|>Vc$$

wherein Vc refers to a critical voltage required for inverting the remnant polarization of the ferroelectric layer.

3. The method of claim 2, wherein the predetermined voltage Vr is applied to the resistive probe, which is most adjacent to the domain of the ferroelectric writing medium, by applying a first voltage V1 and a second voltage V2, which are different, to the resistive probe.

4. The method of claim 1, wherein the ferroelectric layer is formed of one selected from the group consisting of a PZT layer, a BTO layer, a TGS layer, and a TGSe layer.

5. The method of claim 1, wherein the ferroelectric layer is formed of a dielectric layer having a high coercive field in the domain on which data will be written.

6. A method of writing data on a memory device comprising a resistive probe used for reading and writing data, a ferroelectric writing medium on which data is written by the resistive probe, and a lower electrode disposed on a bottom surface of the ferroelectric writing medium, the method comprising:

(a) lowering a coercive field in a domain of the ferroelectric writing medium, on which data will be written; and (b) writing data on the domain of the ferroelectric writing medium having the lowered coercive field, wherein in step (a), the domain of the ferroelectric writing medium, on which data will be written, is heated.

7. The method of claim 6, wherein step (a) and step (b) are performed simultaneously.

8. The method of claim 6, wherein in step (b), an electric field is applied to the domain of the ferroelectric writing medium.

9. The method of claim 6, wherein the domain of the ferroelectric writing medium, on which data will be written, is heated by generating heat in the resistive probe, which is most adjacent to the domain of the ferroelectric writing medium.

10. The method of claim 9, wherein heat is generated in the resistive probe, which is most adjacent to the domain of the ferroelectric writing medium, by applying a first voltage V1 and a second voltage V2 to the resistive probe.

11. The method of claim 6, wherein a predetermined voltage Vr is applied to the resistive probe, which is most adjacent to the domain of the ferroelectric writing medium, and another predetermined voltage V3 is applied to the lower electrode, wherein a relationship between the voltage Vr and the voltage V3 is expressed as in the following equation:

$$|V3-Vr|>Vc$$

wherein Vc refers to a critical voltage required for inverting the remnant polarization of the ferroelectric layer.

12. The method of claim 6, wherein the ferroelectric writing medium is formed of one selected from the group consisting of a PZT layer, a BTO layer, a TGS layer, and a TGSe layer.

13. The method of claim 1, wherein the applying of heat lowers a coercive field in a domain of the ferroelectric writing medium.

14. The method of claim 1, wherein the applying of heat is carried out so that a tip of the resistive probe is heated to a temperature in a range of 500° C. to 700° C.

15. A method of writing data on a memory device comprising a resistive probe used for reading and writing data, a ferroelectric writing medium on which data is written by the resistive probe, and a lower electrode disposed on a bottom surface of the ferroelectric writing medium, the method comprising:

(a) lowering a coercive field in a domain of the ferroelectric writing medium, on which data will be written; and (b) writing data on the domain of the ferroelectric writing medium having the lowered coercive field, wherein step (a) comprises heating a tip of the resistive probe is heated to a temperature in a range of 500° C. to 700° C.

* * * * *